US011731094B2

(12) United States Patent
Gupta et al.

(10) Patent No.: US 11,731,094 B2
(45) Date of Patent: Aug. 22, 2023

(54) PROCESS FOR MULTISTAGE HYDROPROCESSING IN A SINGLE REACTOR

(71) Applicant: Indian Oil Corporation Limited, Mumbai (IN)

(72) Inventors: Yamini Gupta, Faridabad (IN); Arun Arangarasu, Faridabad (IN); Nepal Viswakarma, Faridabad (IN); Ganesh Vitthalrao Butley, Faridabad (IN); Sarvesh Kumar, Faridabad (IN); Madhusudan Sau, Faridabad (IN); Gurpreet Kapur Singh, Faridabad (IN); Sankara Sri Venkata Ramakumar, Faridabad (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 0 days.

(21) Appl. No.: 17/814,929

(22) Filed: Jul. 26, 2022

(65) Prior Publication Data

US 2023/0035683 A1 Feb. 2, 2023

(30) Foreign Application Priority Data

Jul. 27, 2021 (IN) .............................. 202121033679

(51) Int. Cl.
*B01J 8/00* (2006.01)
*B01J 8/02* (2006.01)
(Continued)

(52) U.S. Cl.
CPC ............ *B01J 8/0221* (2013.01); *C10G 45/22* (2013.01); *C10G 45/72* (2013.01); *C10G 47/10* (2013.01);
(Continued)

(58) Field of Classification Search
CPC ...... C10G 45/22; C10G 49/002; C10G 47/10; C10G 45/72; C10G 65/12;
(Continued)

(56) References Cited

U.S. PATENT DOCUMENTS

| 6,123,835 A | 9/2000 | Ackerson et al. |
| 7,799,208 B2 | 9/2010 | Kokayeff et al. |
| 9,914,104 B2 | 3/2018 | Parihar et al. |

FOREIGN PATENT DOCUMENTS

| IN | 309876 B | 3/2019 |
| WO | 2016106228 A1 | 6/2016 |

*Primary Examiner* — Prem C Singh
*Assistant Examiner* — Brandi M Doyle
(74) *Attorney, Agent, or Firm* — Workman Nydegger

(57) ABSTRACT

The present invention provides a multistage single reactor system for hydroprocessing and a process of carrying out multistage hydroprocessing in the said reactor assembly consisting of, a fixed bed solid catalyst system, a feed injection system enabling axial flow of hydrogen saturated hydrocarbon feed, a hydrogen dispensing system inside the reactor enabling minimum required hydrogen flow in cross-flow pattern, also using multitudes of integrated separation and withdrawal limbs for continuous staging. The innovative reactor disclosed in the present invention enables continuous separation and withdrawal of gaseous products along the reactor length by means of combined horizontal reactor orientation and vertical separation limbs provided at the top of the horizontally oriented reactor. The advantage of the reactor assembly includes effective heat sink of exothermic reactions and lower severity of operation due to removal of inhibitory gaseous products.

11 Claims, 1 Drawing Sheet

(51) Int. Cl.
*C10G 45/22* (2006.01)
*C10G 45/72* (2006.01)
*C10G 47/10* (2006.01)
*C10G 65/12* (2006.01)

(52) U.S. Cl.
CPC ..... *C10G 65/12* (2013.01); *B01J 2208/00911* (2013.01); *C10G 2300/1044* (2013.01); *C10G 2300/1059* (2013.01); *C10G 2300/1074* (2013.01); *C10G 2300/202* (2013.01); *C10G 2300/4006* (2013.01); *C10G 2300/4012* (2013.01); *C10G 2300/4018* (2013.01); *C10G 2400/02* (2013.01); *C10G 2400/04* (2013.01)

(58) Field of Classification Search
CPC .... C10G 2300/1059; C10G 2300/1074; C10G 2300/1044; C10G 2300/4018; C10G 2400/02; C10G 2300/4012; C10G 2300/4006; C10G 2300/202; C10G 2400/04; B01J 8/0278; B01J 8/001; B01J 8/0085; B01J 4/002; B01J 8/0221; B01J 4/004; B01J 2208/00964; B01J 2204/005; B01J 2208/00017; B01J 2208/00274; B01J 2208/00902; B01J 2208/0061; B01J 2219/00245; B01J 2208/00557; B01J 2208/00973; B01J 2208/00539; B01J 2208/00911

See application file for complete search history.

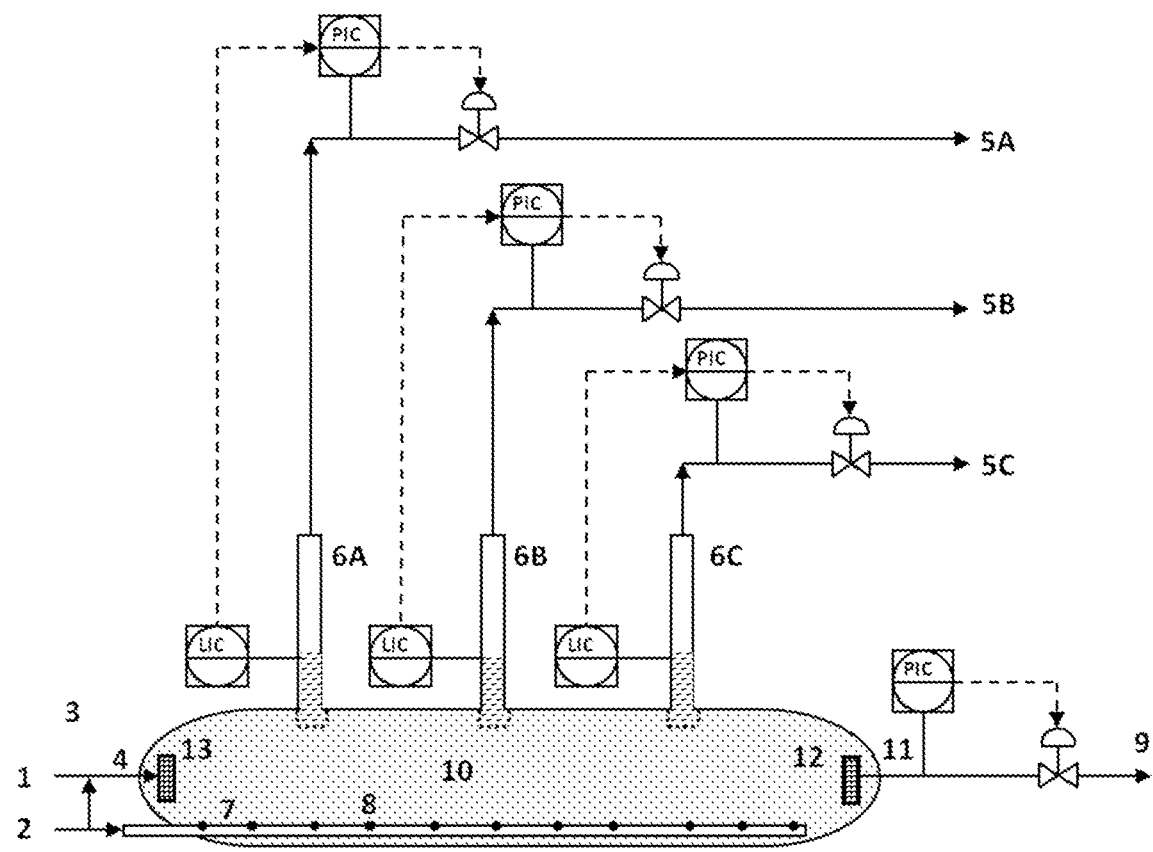

PROCESS FOR MULTISTAGE HYDROPROCESSING IN A SINGLE REACTOR

FIELD OF THE PRESENT INVENTION

The present invention relates to a process for carrying out multistage hydroprocessing of a hydrocarbon feed in a specially designed single reactor wherein, the reaction occurs in predominantly liquid phase under iso-thermal conditions. Further, the present invention relates to a horizontally oriented reactor system that enables continuous removal of reaction gaseous products alone, while retaining the liquid feed. It also effects heat removal of the exothermic reactions during the multistage hydroprocessing reactions.

BACKGROUND OF THE PRESENT INVENTION

Crude oil includes various petroleum fractions like naphtha, kerosene, gas-oil, wax, and heavy oils which can be separated via distillation. Fractions like naphtha, kerosene and gas-oil can be upgraded to finished products like gasoline, kerosene and diesel whereas, heavier oils are further cracked into smaller molecules via thermal or catalytic cracking. These downstream processes are termed as secondary processes. Intermediate hydrocarbon streams can be upgraded to finished products via a family of secondary processes grouped together as Hydroprocessing.

Hydroprocessing is a highly exothermic process involving treatment of hydrocarbon feedstock with hydrogen in the presence of a suitable catalyst to achieve various objectives like hydrogenation of olefins and aromatics, hydrocracking of longer chain molecules, removal of hetero-atoms like sulfur, nitrogen, oxygen, metals, etc for production of fuels of desired quality. It is generally carried out in adiabatic mode with intermediate quenching to check the rise in temperature due to the exothermic nature of the reactions. In hydroprocessing, treatment with hydrogen results in hydrogenation of unsaturated hydrocarbon molecules and hydrocracking of long chain molecules. Hydroprocessing is the most generally used process in refineries today to obtain valuable petroleum products. It involves a hydrocarbon feedstock along with hydrogen gas under catalytic processing at high temperature and pressure conditions suitable to achieve the product specifications. The process generally can be classified in two major classes, first one is hydrotreating, where there is no major change in molecular weight of the feedstock, only heteroatoms are removed. The second class of hydroprocessing is hydrocracking, where there is conversion by means of cracking of heavy molecules to lighter (more usable) molecules in presence of high hydrogen partial pressures. Therefore, hydroprocessing is the most desirous way to achieve major product fuel specifications and has emerged as major process in refining field, second only to crude distillation Various processes are available conventionally to crack and treat heavy hydrocarbon fractions into lighter hydrocarbons and further reduce metals, sulfur, nitrogen, and acidity of the hydrocarbon. Conventionally, a hydrocarbon-feedstock is hydrotreated and/or cracked by passing the hydrocarbon-containing feedstock over a catalyst located in a fixed bed catalyst reactor in the presence of hydrogen at a temperature effective to reduce the sulfur content, nitrogen content, metals content, and/or the acidity of the feedstock and/or crack heavy hydrocarbons in the feedstock. Another method involves dispersing a catalyst in the feedstock and passing the mixture together with hydrogen through a slurry-bed or fluid-bed reactor operated at a temperature effective to crack heavy hydrocarbons in the feedstock. Examples of such slurry-bed or fluid-bed reactors include ebullating-bed reactors, plug-flow reactors, and bubble-column reactors.

Prior work has been carried out to overcome the inherent limitations of Fixed Bed Reactors (FBRs) in application for hydroprocessing with special emphasis being on overcoming the mass transfer limitations via employing liquid phase hydrotreating and introducing multi-staging via process intensification. Multiple stage configurations disclosed so far mostly have been commonly associated with consecutive stages being operated in a separate dedicated reactor. Novel reactor designs eliminating the necessity of an additional separation vessel utilizing liquid phase hydrotreating have also been discussed. Nonetheless, multiple stage configurations disclosed so far have still been associated with separate dedicated reactors.

U.S. Pat. No. 9,914,104B2 relates to methods, apparatus and processes for three phase contacting and reactions in a cross flow reactor with reduced feed vaporization, low pressure operation, higher liquid holdup, lower reactor pressure drop, low severity operation, and reduced product inhibitory effects. The reactor has a central gas distributor with perforated lateral surface for distributing gas, a middle region accommodating a packed catalyst bed, and an outer gas space for removal of effluent gases from the middle region. The novel reactor introduces continuous multiple stages while eliminating the requirement of a separate reactor or vessel, but the designing of a lateral outer perforated surface enabling removal of gaseous products and hydrogen only while retaining the liquid feed is a practical challenge. WO2016106228A1 discloses a horizontal bubble reactor for slurry hydroprocessing of a heavy hydrocarbon feedstock having an API Gravity of less than 20, where the reactor is fitted with one or more vapor-only outlets to provide intrinsic separation of catalyst from product. IN309876 deals with an innovative process for intensification configuration scheme of hydrotreatment of diesel under predominantly liquid phase conditions that provides the multitude of zones of hydrotreatment to produce ultra low sulfur diesel range boiling hydrocarbon stream with means of making up continuously depleting hydrogen concentrations levels in predominantly liquid phase diesel boiling range hydrocarbon stream and with means of reducing the levels of concentrations of reaction products such as hydrogen sulfide, etc for avoiding the formation of recombinant mercaptans. U.S. Pat. No. 6,123,835 provides a hydroprocessing method for treating a feed with hydrogen in a reactor, the improvement comprising a two liquid phase hydroprocessing method comprising the steps of at least one of mixing and flashing the hydrogen and the feed to be treated in the presence of a solvent or diluent wherein the percentage of hydrogen in solution is greater than the percentage of hydrogen in the feed to form a two liquid phase feed/diluent/hydrogen mixture. This step is followed by separating the gas from the two liquid phase mixture upstream of the reactor, and then reacting the feed/diluent/hydrogen mixture with a catalyst in the reactor to remove contaminants and saturate aromatics. U.S. Pat. No. 7,799,208 provides a method of hydrocracking hydrocarbon streams that substantially employs liquid-phase continuous hydroprocessing conditions. The method primarily includes a separate hydrotreating and hydrocracking system where the hydrocracking zone is a substantially liquid-phase continuous system. The method further includes a two-stage hydrocracking system where one or both of the hydrocracking zones is a substantially liquid-phase continuous reaction system.

However, most of the conventional hydroprocessing reactors suffer from the inherent limitations of mass transfer, big reactor size, reaction exotherm management, secondary cracking of reaction products, inhibitory effects of reaction products like $H_2S$ and $NH_3$. In conventional trickle bed reactor system, carefully designed distributor systems are required to uniformly distribute gas and liquids over the catalyst bed to avoid the hot spots and temperature run away and for proper utilization of total loaded catalyst volumes. These distributors are referred to as the two-phase gas-liquid distributors. These two phase distributors are specially designed to uniformly distribute the gas and liquid over the entire cross-section of reactor diameter at lowest possible pressure drops.

For this, wide ranges of distributors are employed ranging from a simple chimney tray to more advanced vapor lift distributors. Further, these distributors need to operate at wide ranges of gas and liquid flows to be more effective. In the conventional trickle bed reactor system, as the hydrogen gas and liquid flows over the catalyst bed, dissolved hydrogen depletion occurs due to consumption of hydrogen during hydroprocessing reactions, which is continuously replenished by gas phase hydrogen already present in the reactor in abundance, thus maintaining the liquid phase hydrogen concentration always at saturated levels whereby the process requires the use of cost intensive separation system to separate the unreacted hydrogen from the liquid product and recycle gas compressor for recycling the abundant separated hydrogen. Additionally, hydroprocessing is an equilibrium controlled reaction. Intermediate removal of products has multi-fold advantages. It shifts the equilibrium towards the products. Also, removal of inhibitory products like $H_2S$ and $NH_3$ increases the overall conversion. Removal of products in conventional hydroprocessing reactors requires introduction of capital intensive additional separation and reaction vessels. This necessitates the introduction of multiple stages in a single reactor without the requirement of any extra vessel and subsequently overcoming the conventional complexities of reactors through use of a single phase system of liquid hydrocarbon along with hydrogen. Thus, a reactor of efficient orientation and design is of utmost need that would further enable continuous removal of reaction gaseous products alone while retaining the liquid feed.

Objectives of the Present Invention

The primary objective of the present invention is to provide a reactor system for multistage hydroprocessing of liquid hydrocarbon feed in a single reactor.

Another objective of the present invention is to provide a horizontally oriented reactor system employing the benefits of cross flow in a liquid phase process whereby the mass transfer limitation is circumvented.

Another objective of the present invention is to provide a reactor system that includes effective heat sink of exothermic reactions and lower severity of operation due to removal of gaseous product, including the inhibitory products.

Another objective of the present invention is to provide a process for production of ultra low sulfur gasoline and diesel fuels by avoiding recombinant mercaptan formation by effecting removal of in-situ $H_2S$ from the reaction mixture.

Another objective of the present invention is to provide a reactor system that enables the continuous removal of reaction gaseous products alone while retaining the liquid feed always saturated with hydrogen to form a single phase that undergoes hydroprocessing while passing over the catalyst system in the horizontal reactor.

Yet another objective of the present invention is to provide single phase, multistage hydroprocessing of liquid hydrocarbon feed pre-saturated with hydrogen in a horizontal reactor system.

SUMMARY OF THE PRESENT INVENTION

Accordingly, the present invention provides a reactor orientation and design that enables the continuous removal of reaction gaseous products alone while retaining the liquid feed in a single reactor. The reactor system of the present invention overcomes the inherent disadvantages of a trickle bed reactor by employing the benefits of predominantly horizontal flow in a liquid phase process, wherein the liquid is saturated with hydrogen throughout the reactor length, thereby circumventing the mass transfer limitation. Moreover, the advantages obtained are augmented via process intensification effecting continuous withdrawal of the products throughout the reactor length without the introduction of any new vessel, thereby imparting the multistaging effect in a single reactor.

The present invention thus provides a reactor system for a single phase, multistage hydroprocessing of a liquid hydrocarbon feed pre-saturated with hydrogen, the reactor system comprising:

a horizontal reactor (10) with a feed inlet nozzle (4) at one lateral end for axial entry of a premixed mixture of liquid hydrocarbon feed (1) and gaseous hydrogen (2) at mixing point (3), a fixed bed catalyst loaded inside the reactor (10) throughout length of the reactor, wherein the reactor is a fixed bed reactor, a longitudinal sparger (7) running along bottom portion of the reactor (10) with a multitude of nozzles (8) provided at top periphery of the sparger (7) to distribute gaseous hydrogen, a multitude of vertically oriented gas separation and withdrawal means (5, 6) provided at top of the reactor (10) acting as micro separation vessels and withdrawal assembly, integrated with the reactor for removal of product gases comprising ammonia ($NH_3$), hydrogen sulfide ($H_2S$), and dry gases that rise as bubbles against horizontally flowing liquid hydrocarbon feed, wherein the gas separation and withdrawal means (5, 6) are vertical separation limbs each provided with pressure and level control devices to control pressure and levels of each portion, and wherein each vertical limb comprises a gas-liquid disengaging space (6A, 6B and 6C) and gas withdrawal assembly (5A, 5B and 5C), an outlet product collector (9) provided with small outlet collectors distributed uniformly along cross section of the horizontal reactor designed to avoid accumulation of liquids at other lateral end of the reactor (10) and enable removal of liquid product depleted of heteroatoms to an extent of complying with BS-VI standards, wherein the liquid product is liquid Ultra Low Sulfur Gasoline (ULSG) or Ultra Low Sulfur Diesel (ULSD).

The dry gases specifically refer to methane and ethane in the art. But here dry gases include methane, ethane, and other lighter hydrocarbons such as propane and butane which are not in liquid state under the operating conditions in the reactor.

Further, the present invention provides a process for multistage hydroprocessing of a single phase liquid hydrocarbon feed using a horizontal reactor system, the process comprising:

introducing a liquid hydrocarbon feed pre-saturated with hydrogen into a feed inlet nozzle of a horizontal reactor as a single phase system, wherein the liquid hydrocarbon feed is pre-saturated with hydrogen by pre-mixing with hydrogen and pre-heated to a hydroprocessing reaction temperature ranging from 120-400° C., more preferably, 200 to 350° C.;

hydroprocessing the single phase system of liquid hydrocarbon feed pre-saturated with hydrogen by passing the single phase system axially along the reactor over a fixed bed catalyst system, wherein dissolved hydrogen present in the single phase system is depleted due to consumption of the hydrogen during the hydroprocessing;

adding fresh hydrogen at multiple discrete intervals through the sparger at the bottom of the reactor to replenish hydrogen depletion at a rate to keep the liquid hydrocarbon feed in the reactor always saturated with hydrogen;

removing gaseous products obtained during the hydroprocessing through a multitude of vertically oriented gas separation and withdrawal means at top of the reactor, wherein the gas separation and withdrawal means are provided with pressure and level control devices that separate the gaseous products from a reaction mixture;

collecting liquid product from the reactor through an outlet product collector provided at other end of the reactor, wherein the collector comprises small outlet collectors distributed uniformly along entire cross section of the horizontal reactor designed to avoid accumulation of liquid product.

BRIEF DESCRIPTION OF THE DRAWINGS OF THE PRESENT INVENTION

FIG. 1 illustrates a schematic representation of a multistage hydroprocessing reactor.

DETAILED DESCRIPTION OF THE PRESENT INVENTION

For the purpose of promoting an understanding of the principles of the present disclosure, reference will now be made to the specific embodiments of the present invention further illustrated in specific language to describe the same. The foregoing general description and the following detailed description are explanatory of the present disclosure and are not intended to be restrictive thereof. It will nevertheless be understood that no limitation of the scope of the present disclosure is thereby intended, such alterations and further modifications in the illustrated composition, and such further applications of the principles of the present disclosure as illustrated herein being contemplated as would normally occur to one skilled in the art to which the present disclosure relates. Unless otherwise defined, all technical and scientific terms used herein have the same meaning as commonly understood by one ordinarily skilled in the art to which this present disclosure belongs. The methods, products and examples provided herein are illustrative only and not intended to be limiting.

The reactor design of the present invention enables single phase reaction, continuous removal of the reaction products and excess heat, coupled with the cross-flow injection of fresh hydrogen, aid in attainment of near iso-thermal profile along the length of the reactor wherein, at each point the reaction occurs between 100% feed and pure hydrogen present in a single uniform phase, thereby: (i) eliminating the possibility of secondary cracking and inhibitory effects of reaction products, (ii) ensuring controlled undesired reactions at reactor outlet like mercaptan recombination due to negligible partial pressure of $H_2S$, and (iii) resulting in increasing conversion due to lower mass transfer limitations. Continuous removal of reaction products (lighter hydrocarbons & hydrogen sulfide & ammonia) also results in the improvement in reaction rate due to higher contacting efficiency of remaining liquid and catalyst. The reactor assembly of the present invention includes effective heat sink of exothermic reactions and lower severity of operation due to removal of inhibitory gaseous product.

The present invention thus provides a reactor system for a single phase, multistage hydroprocessing of a liquid hydrocarbon feed pre-saturated with hydrogen, the reactor system (FIG. 1) comprising:

a horizontal reactor (10) with a feed inlet nozzle (4) at one lateral end for axial entry of a premixed mixture of liquid hydrocarbon feed (1) and gaseous hydrogen (2) at mixing point (3), a fixed bed catalyst loaded inside the reactor (10) throughout length of the reactor, wherein the reactor is a fixed bed reactor, a longitudinal sparger (7) running along bottom portion of the reactor (10) with a multitude of nozzles (8) provided at top periphery of the sparger (7) to distribute gaseous hydrogen, a multitude of vertically oriented gas separation and withdrawal means (5, 6) provided at top of the reactor (10) acting as micro separation vessels and withdrawal assembly, integrated with the reactor for removal of product gases comprising ammonia ($NH_3$), hydrogen sulfide ($H_2S$), and dry gases that rise as bubbles against horizontally flowing liquid hydrocarbon feed, wherein the gas separation and withdrawal means (5, 6) are vertical separation limbs each provided with pressure and level control devices to control pressure and levels of each portion, and wherein each vertical limb comprises a gas-liquid disengaging space (6A, 6B and 6C) and gas withdrawal assembly (5A, 5B and 5C), an outlet product collector (9) provided with small outlet collectors distributed uniformly along cross section of the horizontal reactor designed to avoid accumulation of liquids at other lateral end of the reactor (10) and enable removal of liquid product depleted of heteroatoms to an extent of complying with BS-VI standards, wherein the liquid product is liquid Ultra Low Sulfur Gasoline (ULSG) or Ultra Low Sulfur Diesel (ULSD).

The dry gases specifically refer to methane and ethane in the art. But here dry gases include methane, ethane, and other lighter hydrocarbons such as propane and butane which are not in liquid state under the operating conditions in the reactor. The heteroatoms that are removed from the liquid product are primarily sulfur and nitrogen.

In an embodiment, the present invention provides that the catalyst is a fixed bed catalyst system with similar catalysts as employed in the conventional hydroprocessing reactors comprising two or more metals selected from base metals of Groups VI and VII comprising nickel, cobalt, molybdenum, tungsten, boron, phosphorus, iron, in sulfided form and is distributed on high surface area support. The support optionally has an acidic function if required.

In another embodiment, the present invention provides that diameter of the reactor is such that superficial velocity of the liquid hydrocarbon feed flowing horizontally ranges from 0.1 to 10 m/s. Preferably, the velocity is between 0.1 to 5 m/s. Here the diameter is expressed in terms of superficial velocity which encompasses the feed rate and diameter of reactor both.

In another embodiment, the present invention provides that the horizontal length of the reactor ranges from 3 to 30 times the diameter of the reactor.

In another embodiment, the present invention provides that the sparger (7) is provided with a multitude of nozzles to maintain the liquid hydrocarbon feed saturated with hydrogen and the nozzles are provided with holes having diameter ranging from 0.01 mm to 1.0 mm. The depleted hydrogen in the liquid hydrocarbon feed is replenished by this specially designed sparger provided inside the reactor. The sparger runs longitudinally along the lower end of the reactor and is designed to redistribute pre-calculated quantities of hydrogen at multitude of discreet points having multitude of holes so as to maintain the liquid hydrocarbon feed saturated with hydrogen at all times. The sparger tube having multitude of holes at multitude of discreet points runs from the inlet end to the last gaseous product withdrawing limb of the reactor. Further, the hydrogen is also injected continuously in similar but alternative way through numerous nozzles provided at the upper periphery of the longitudinal distributor along the entire lower length of the reactor. The quantity of hydrogen provided through the sparger point is controlled to control the degree of saturation. The quantity of hydrogen to be provided is calculated based on feed properties, the desired conversion and the reaction parameters, and also from the unreacted hydrogen available in reactor effluent.

In another embodiment, the present invention provides that the height of the vertical separation limb at the top of the reactor (10) ranges from 5 to 20 times of diameter of the vertical separation limb.

In another embodiment, the present invention provides that the diameter of the vertical separation limb ranges from 0.1 to 1 times the diameter of the reactor (10). All the vertical separation limbs or stems are having equal diameters.

In yet another embodiment, the present invention provides that the vertical separation limbs are equidistantly located along horizontal length of the reactor (10).

In another embodiment, the present invention provides that distance of the vertical separation limb just next to the feed inlet nozzle from tangential length of the reactor is same as distance between any two consecutive vertical separation limbs, and distance of the vertical separation limb just prior to the outlet product effluent nozzle from tangential length of the reactor is same as distance between any two consecutive vertical limbs.

In another embodiment, the present invention provides that 1 to 10, more preferably 1 to 5 vertical separation limbs are present throughout length of the reactor.

The cylindrical vertical limbs act as micro separation vessels integrated with the reactor. A predetermined reactor liquid level is maintained in the vertical limb. Pressure control valves provided at the top of each separation limbs control the pressure of the separation region such that separation of the dissolved gases, i.e., hydrogen and gaseous products is enabled. The pressure drop across the reactor and the separation limbs assists in continuous withdrawal of gaseous products through the pressure control valve.

The contents of the reactor are associated with some thermal energy. The quantity of energy depends on the specific heat capacity and temperature of the molecules. As per the present invention, when the reaction product gases are removed from the reactor through the multitude of vertical limbs provided at the top of the reactor, the mass of gases removed carries away with itself an equivalent amount of heat. The quantity of heat removed can be regulated via regulating the withdrawal rate of the reaction products. This combined withdrawal of mass and heat from the reactor system results in a near iso-thermal profile inside the reactor. Requirement of quench fluid (Gas or liquid stream) along with the associated reactor internals is omitted. The reaction products of hydroprocessing reactions like $H_2S$, $NH_3$, and lighter hydrocarbons are generated during the course of reaction as the liquid hydrocarbon saturated with dissolved hydrogen comes in contact with catalyst particles. These gaseous reaction products rise in the form of bubbles vertically upwards against the horizontally flowing liquid over the catalyst bed. Hold-up of reaction products inside the reactor decreases the residence time available for the feed molecules. It also leads to secondary cracking and yield loss. Thus, instantaneous withdrawal of product molecules results in higher yields, higher conversion and lower catalyst requirement. Another added advantage of withdrawal of gaseous products is the removal of associated heat thereby reducing the reaction exotherm and thus, eliminate the requirement of quench system.

These specially designed vertically oriented multitude of limbs having circular cross-section are provided with level control for maintaining a pre-determined reactor liquid level in the vertical space. The pressure of the vertical limb is controlled with a pressure control valve provided at the upper vapour space of the limb. The vertical limb thus provided acts as a disengaging space for the liquid hydrocarbon and the gaseous products. The height of the vertical limb and the level therein determines the vapour-liquid disengaging space and also is one of the factors in regulating the pressure drop enabling product withdrawal. The pressure of the vertically oriented gas separation means or vertical limb is varied in order to control the extent of separation, while pressure control valves are responsible to maintain a liquid level in the separation limb. The pressure in each vertical separation limb can be controlled individually and thus the conversions and yields of individual fractions along the reactor length can be designed.

In another embodiment, the present invention provides that the liquid product from the outlet of the reactor is collected in a multitude of small outlet collectors (12) distributed in uniform fashion horizontally along entire cross section of the reactor to avoid accumulation of any liquids. Pressure of the entire reactor is controlled by a pressure control device provided at the reactor outlet. The liquid product which also consists of dissolved hydrogen is further sent to a stripper followed by a fractionator. The requirement of a recycle gas compressor is eliminated. Downstream processing of reaction product will be evident to those skilled in the art.

Further, the present invention provides a process for single phase, multistage hydroprocessing of liquid hydrocarbon feed using a horizontal reactor system, the process comprising:
introducing a liquid hydrocarbon feed pre-saturated with hydrogen into a feed inlet nozzle of a horizontal reactor as a single phase system, wherein the liquid hydrocarbon feed is pre-saturated with hydrogen by pre-mixing with hydrogen and pre-heated to a hydroprocessing reaction temperature ranging from 120 to 400° C., more preferably, 200 to 350° C.;

hydroprocessing the single phase system of liquid hydrocarbon feed pre-saturated with hydrogen by passing the single phase system axially along the reactor over a fixed bed catalyst system, wherein dissolved hydrogen present in the single phase system is depleted due to consumption of the hydrogen during the hydroprocessing;

adding fresh hydrogen at multiple discrete intervals through the sparger at the bottom of the reactor to replenish hydrogen depletion at a rate to keep the liquid hydrocarbon feed in the reactor always saturated with hydrogen;

removing gaseous products obtained during the hydroprocessing through a multitude of vertically oriented gas separation and withdrawal means at top of the reactor, wherein the gas separation and withdrawal means are provided with pressure and level control devices that separate the gaseous products from a reaction mixture;

collecting liquid product from the reactor through an outlet product collector provided at other end of the reactor, wherein the collector comprises small outlet collectors distributed uniformly along entire cross section of the horizontal reactor designed to avoid accumulation of liquid product.

In another embodiment, the present invention provides that the hydroprocessing reaction is carried out at a temperature ranging from 120-450° C., more preferably 200 to 350° C., a pressure ranging from 15-200 barg, and a space velocity ranging from 0.5 to 4.0 h$^{-1}$.

In another embodiment, the present invention provides that the liquid hydrocarbon feed comprises straight run and cracked Naphtha, Gas Oil, Vacuum Gas Oil, or a combination thereof comprising of hetero atoms selected from sulfur and nitrogen or of long chain hydrocarbons which need to undergo hydrocracking.

In another embodiment, the present invention provides that the rate of hydrogen purging from the sparger ranges from 1 to 100 Nm$^3$ per m$^3$ of liquid hydrocarbon feed.

In another embodiment, the present invention provides that the gaseous product comprises H$_2$S, NH$_3$, and dry gases; and the liquid product comprises a hydrotreated gasoline or diesel product containing less than 10 ppm sulfur.

In the present invention, the depletion of dissolved hydrogen is overcome by adding fresh colder hydrogen at multiple discrete intervals through the gas sparger/distributor placed at the bottom of the reactor (opposite the vertical stems of gas-liquid separators), thus continuously replenishing the depleted hydrogen in liquid hydrocarbon phase. The rate of hydrogen fed is controlled in such a way that the liquid in the reactor is always saturated with the dissolved hydrogen. This is ensured by ensuring that the liquid coming out of the reactor system is always saturated with hydrogen. The rate of this hydrogen can be increased or decreased depending on the extent of hydroprocessing reactions. Thus, giving the dual benefits of reducing the reaction temperature, while meeting the stoichiometric requirement of hydrogen and eventually enhances overall performance life of catalyst system. This injection of only stoichiometric quantities of hydrogen also eliminates the use of cost intensive recycle gas compressor.

The reactants, viz. hydrocarbon feed and the dissolved hydrogen constitute a single phase and flow horizontally over the catalyst bed at reaction conditions. As the hydrogen is present in dissolved state in the hydrocarbon feed, the reactants are present in a single uniform phase. Hence, the resistances offered during the transfer of one reactant, namely hydrogen from its own bulk gas phase into the bulk phase of the other reactant, namely hydrocarbon is eliminated. It will be known to those skilled in the art that efficient contact between the reactants and distribution of the reactants uniformly over the catalyst is of prime importance in achieving desired conversion and limit the side reactions. The liquid filled reactor, with hydrogen being present in dissolved state removes the G-L interface and film mass transfer resistances and hence ensures efficient contacting along the entire length of the reactor.

As the feed flows horizontally along the reactor length, the reactor conditions facilitate the hydroprocessing reactions to occur. As the reactions proceed, they result in formation of gaseous products and a corresponding reduction in hydrogen concentration due to consumption of the same. The novel design of the horizontal reactor replenishes the depleted hydrogen throughout the reactor length thus maintaining the single phase conditions throughout the reactor and also facilitates immediate withdrawal of reaction products in gaseous state. The benefits of in-situ withdrawal of reaction products in gaseous state are multifold in nature defined to the extent of conversion required in of any that said process. Hydrotreating gaseous products, consisting of H$_2$S, NH$_3$ have an inhibitory effect on hydroprocessing reactions. Immediate withdrawal of H$_2$S and NH$_3$ from the reaction mixture mitigate the impedance imposed by these reaction products.

The present invention offers the following technical advantages compared to the available conventional hydroprocessing processes:
    Lower process temperatures
    Lower secondary cracking and higher liquid yield
    Smaller reactor size
    Longer catalyst life
    Avoids mercaptan recombination reaction
    Lower hydrogen consumption
    Elimination of reactor quench fluid and associated internals
    Elimination of recycle gas compressor The disclosed reactor design is applicable to all types of hydroprocessing units. The additional technical advantages include:
    Lower operating costs due to lower process temperatures, lower Hydrogen consumption.
    Higher revenue generation due to higher liquid yield.
    Capital cost saving due to smaller reactor size and elimination of hardware associated with reactor quench and recycle gas compressor.
    Longer catalyst life translates into lower catalyst cost and lower down time throughout the operating life of the process unit.

The present invention provides the following illustrative non-limiting example to better describe the workability of the present invention.

EXAMPLES

The reactor system has been described schematically in FIG. 1. Preheated liquid hydrocarbon feed (1) is pre-mixed with gaseous hydrogen (2) at the mixing point 3. The hydrogen saturated liquid (4) enters the horizontal reactor (10) axially through one end. Gaseous hydrogen (2) apart from getting pre-mixed with hydrocarbon feed also enters the bottom portion of the reactor through a longitudinal sparger/distributor (7) running throughout the reactor. The sparger/distributor has multitude of nozzles (8) provided at the top periphery of the distributor to redistribute gaseous hydrogen into the hydrogen depleted hydrocarbon stream. The reaction products formed are withdrawn continuously from the reactor through the multitude of vertically oriented gas separation means or vertical limbs provided at the top of the reactor. Each limb is provided with pressure and level control devices to control pressure and levels of each portion individually. The vertically oriented gas separation means or vertical limbs comprise of a gas-liquid disengaging space (6A, 6B and 6C) and gas withdrawal assembly (5A, 5B and 5C). The reactor liquid product exits (9) the reactor through the common reactor outlet nozzle (11). Pressure of the entire reactor is controlled by a pressure control device provided at the reactor outlet.

What is claimed is:

1. A reactor system for a single phase, multistage hydroprocessing of a liquid hydrocarbon feed pre-saturated with hydrogen, the reactor system comprising:
a horizontal reactor with a feed inlet nozzle at one lateral end for an axial entry of a premixed mixture of the liquid hydrocarbon feed and gaseous hydrogen at a mixing point;
a fixed bed catalyst loaded inside the horizontal reactor throughout length of the horizontal reactor, wherein the horizontal reactor is a fixed bed reactor;
a longitudinal sparger running along a bottom portion of the horizontal reactor with a multitude of nozzles provided at a top periphery of the sparger to distribute the gaseous hydrogen;
a multitude of vertically oriented gas separation and withdrawal vertical separation limbs provided at a top of the horizontal reactor acting as micro separation vessels and as a withdrawal assembly, integrated with the horizontal reactor for removal of product gases comprising hydrogen sulfide ($H_2S$), ammonia ($NH_3$) and dry gases that rise as bubbles against horizontally flowing liquid hydrocarbon feed, wherein the gas separation and withdrawal vertical separation limbs each are provided with pressure and level control devices to control pressure and levels of each portion, and wherein each vertical separation limb comprises a gas-liquid disengaging space and a gas withdrawal assembly; and
an outlet product collector provided with outlet collectors distributed uniformly along a cross section of the horizontal reactor designed to avoid accumulation of liquids at other lateral end of the horizontal reactor and enable removal of a liquid product depleted of heteroatoms, wherein the liquid product is Ultra Low Sulfur Gasoline (ULSG) or Ultra Low Sulfur Diesel (ULSD).

2. The reactor system as claimed in claim 1, wherein the catalyst is a fixed bed catalyst system comprising two or more metals selected from base metals of Groups VI, and VII comprising nickel, cobalt, molybdenum, tungsten, boron, phosphorus, iron, in a sulfide form and is distributed on a support.

3. The reactor system as claimed in claim 1, wherein a superficial velocity of the liquid hydrocarbon feed flowing horizontally ranges from 0.1 to 10 m/s.

4. The reactor system as claimed in claim 1, wherein a horizontal length of the horizontal reactor ranges from 3 to 30 times a diameter of the horizontal reactor.

5. The reactor system as claimed in claim 1, wherein the sparger is provided with a multitude of nozzles to maintain the liquid hydrocarbon feed saturated with hydrogen and the multitude of nozzles are provided with holes having a diameter ranging from 0.01 mm to 1.0 mm.

6. The reactor system as claimed in claim 1, wherein a height of the vertical separation limb at the top of the horizontal reactor ranges from 5 to 20 times of a diameter of the vertical separation limbs.

7. The reactor system as claimed in claim 1, wherein a diameter of the vertical separation limb ranges from 0.1 to 1 times a diameter of the horizontal reactor.

8. The reactor system as claimed in claim 1, wherein the vertical separation limbs are equidistantly located along horizontal length of the horizontal reactor.

9. The reactor system as claimed in claim 1, wherein a distance of the vertical separation limb just next to the feed inlet nozzle from a tangential length of the horizontal reactor is same as a distance between two consecutive vertical separation limbs, and a distance of the vertical separation limb just prior to the outlet product collector effluent nozzle from the tangential length of the horizontal reactor is same as distance between two consecutive vertical limbs.

10. The reactor system as claimed in claim 1, wherein a total number of the vertical separation limbs present throughout the horizontal length of the horizontal reactor ranges from 1 to 10.

11. The reactor system as claimed in claim 1, wherein the liquid product from the outlet product collector of the horizontal reactor is collected in a multitude of small outlet collectors distributed in uniform fashion horizontally along entire cross section of the horizontal reactor to avoid accumulation of liquids.

* * * * *